United States Patent
Ibamoto et al.

(10) Patent No.: US 6,811,515 B2
(45) Date of Patent: Nov. 2, 2004

(54) TRANSMISSION CONTROL APPARATUS FOR AN AUTOMATIC TRANSMISSION

(75) Inventors: Masahiko Ibamoto, Hitachinaka (JP); Kazuhiko Sato, Hitachioota (JP); Hiroshi Kuroiwa, Hitachi (JP); Makoto Shioya, Suginami-ku (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/423,926

(22) Filed: Apr. 28, 2003

(65) Prior Publication Data

US 2004/0014558 A1 Jan. 22, 2004

Related U.S. Application Data

(63) Continuation of application No. 08/977,895, filed on Nov. 25, 1997, now abandoned.

(30) Foreign Application Priority Data

Nov. 25, 1996 (JP) .............................................. 8-313340

(51) Int. Cl.$^7$ .............................................. B60K 41/04
(52) U.S. Cl. ........................................ 477/97; 477/901
(58) Field of Search .............................. 477/46, 48, 49, 477/97, 901; 701/57, 60, 61, 65

(56) References Cited

U.S. PATENT DOCUMENTS

| | | | | |
|---|---|---|---|---|
| 4,543,077 A | * | 9/1985 | Yamamuro et al. | 477/48 X |
| 4,653,004 A | * | 3/1987 | Osanai et al. | 477/48 X |
| 4,720,793 A | * | 1/1988 | Watanabe et al. | 477/48 X |
| 4,735,112 A | * | 4/1988 | Osanai et al. | 477/480 X |
| 4,945,483 A | * | 7/1990 | Tokoro | 477/48 X |
| 5,337,628 A | * | 8/1994 | Hendriks et al. | 477/48 |
| 5,413,540 A | * | 5/1995 | Streib et al. | 477/46 X |
| 5,544,053 A | * | 8/1996 | Nakashima | 701/57 |
| 5,558,596 A | * | 9/1996 | Adachi et al. | 701/57 |
| 5,761,626 A | * | 6/1998 | Tascillo et al. | 701/29 |
| 5,910,175 A | * | 6/1999 | Malson | 701/57 |
| 5,913,916 A | * | 6/1999 | Bai et al. | 701/59 |

FOREIGN PATENT DOCUMENTS

| | | |
|---|---|---|
| JP | 2-241845 | 9/1990 |
| JP | 6-316232 | 11/1994 |
| JP | 7-89373 | 4/1995 |
| JP | 7-223465 | 8/1995 |
| JP | 8-121202 | 5/1996 |

* cited by examiner

*Primary Examiner*—Sherry Estremsky
(74) *Attorney, Agent, or Firm*—Crowell & Moring LLP

(57) ABSTRACT

The improved CVT control apparatus for a vehicle is disclosed. By using the CVT control apparatus, it becomes possible that the drive feeling is constant independently of a running state, the vehicle is accelerated as the driver's intention if accelerated due to the actuation of an accelerator pedal, and the run of the vehicle is performed so as to improve the fuel consumption rate if the acceleration is not required.

By always calculating a correct driving torque, the transmission gear ratio is calculated to obtain the target driving torque set based on the amount of actuation of an accelerator pedal, and the obtained target driving torque is corrected by the gradient of a road obtained from the calculated driving torque. Further, the gear ratio which aims at the improvement of acceleration and the gear ratio which aims at the improvement of the rate of fuel consumption are weighted and combined with each other, and the optimum gear ratio is obtained by using fuzzy inference.

22 Claims, 9 Drawing Sheets

FIG.10

| INPUT | | | | | | | | | OUTPUT | | | |
|---|---|---|---|---|---|---|---|---|---|---|---|---|
| ΔR2 | | | | ΔR1 | | | Dw | | | ΔR3 | | |
| P&L | P&S | N&S | N&L | P | ≈0 | N | L | M | S | P&L | P&S | N&S | N&L |
| ○ | | | | ○ | | | ○ | | | ○ | | | |
| | | | | | | | | | | | | | |
| | | ○ | | ○ | | | ○ | | | | ○ | | |
| | | | ○ | ○ | | | ○ | | | | | | ○ |
| ○ | | | | | ○ | | ○ | | | ○ | | | |
| | | | | | | | | | | | | | |
| | | ○ | | | ○ | | ○ | | | | | ○ | |
| | | | ○ | | ○ | | ○ | | | | | | ○ |
| ○ | | | | | | ○ | ○ | | | ○ | | | |
| | | | | | | | | | | | | | |
| | | | | | | | | | | | | | |
| | | | | | | ○ | ○ | | | | | | |
| ○ | | | | ○ | | | | ○ | | | | | |
| | | | | | | | | | | | | | |
| | | ○ | | ○ | | | | | | | | | ○ |
| | | | ○ | | ○ | | | | | ○ | | | ○ |
| ○ | | | | | | ○ | | ○ | | | | | |
| | | | | | | ○ | | | ○ | | | | ○ |

TRANSMISSION CONTROL APPARATUS FOR AN AUTOMATIC TRANSMISSION

This application is a continuation of application Ser. No. 08/977,895, filed Nov. 25, 1997 now abandoned.

BACKGROUND OF THE INVENTION

The present invention relates to a transmission control apparatus for an automatic transmission of a vehicle, and more particularly to a control apparatus for a continuously variable transmission (CVT) suitable for a vehicle which can accelerate comfortably based on the driver's intention or the running state of the vehicle and can run with taking the fuel consumption into consideration when the acceleration is not required and a control method thereof.

In a vehicle with the continuously variable transmission, the speed is generally changed by using a control map in which values of the transmission gear ratio pre-determined by the vehicle speed and the throttle opening are represented as a table.

However, in such a control method, it is required to pre-determine a control constant in consideration of various driving conditions when the design or the development of the vehicle is made. It is a task called as tuning or matching, which takes a lot of doing and thus time.

To solve such a problem, it is thought to eliminate the time required to tune by using a control method in which the optimum transmission gear ratio is calculated during run of the vehicle. For example, the method proposed by us is disclosed in Japanese Patent Application Laid-Open No. 7-174219 (1995). However, in this method, the actual driving torque follows the predetermined target value or the target driving torque. There is, therefore, a problem that even though new target driving torque revised according to the situation is preferable, it is impossible to control the transmission gear ratio by setting the new target driving torque as a target value.

SUMMARY OF THE INVENTION

An object of the present invention is to provide an improved CVT control apparatus for a vehicle, in which the time required to tune can be remarkably decreased. By using the improved CVT control apparatus, it becomes possible that the drive feeling is constant independently of the running state, the vehicle is accelerated as the driver's intention if accelerated due to the actuation of an accelerator pedal, and the run of the vehicle is performed so as to improve the fuel consumption rate if the acceleration is not required.

Therefore, by calculating the correct driving torque every time in the present invention, the transmission gear ratio is calculated to obtain the target driving torque set based on the amount of actuation of an accelerator pedal, and the obtained target driving torque is corrected by the gradient of a road obtained from the calculated driving torque. Further, the gear ratio which aims at the improvement of acceleration and the gear ratio which aims at the improvement of the rate of fuel consumption are weighted and combined with each other, and the optimum gear ratio is obtained by using fuzzy inference.

Because the target driving torque is set according to a state at that time during run of a vehicle, and the transmission gear ratio is determined by using the target driving torque, the drive feeling is not changed even if the circumstance of run is changed. Further, the vehicle can be accelerated as the driver's intention at the time of the acceleration due to the actuation of the accelerator pedal, and run of the vehicle is performed so as to improve the fuel consumption rate if the acceleration is not required.

Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

BRIEF DESCRIPTION OF THE DRAWINGS

FIG. 10 is a fuzzy rule table used for fuzzy inference, which composes a weighting and combining means shown in FIG. 7.

DESCRIPTION OF PREFERRED EMBODIMENTS OF THE INVENTION

An embodiment of the present invention will be explained hereinafter with reference to drawings.

Figure 1:
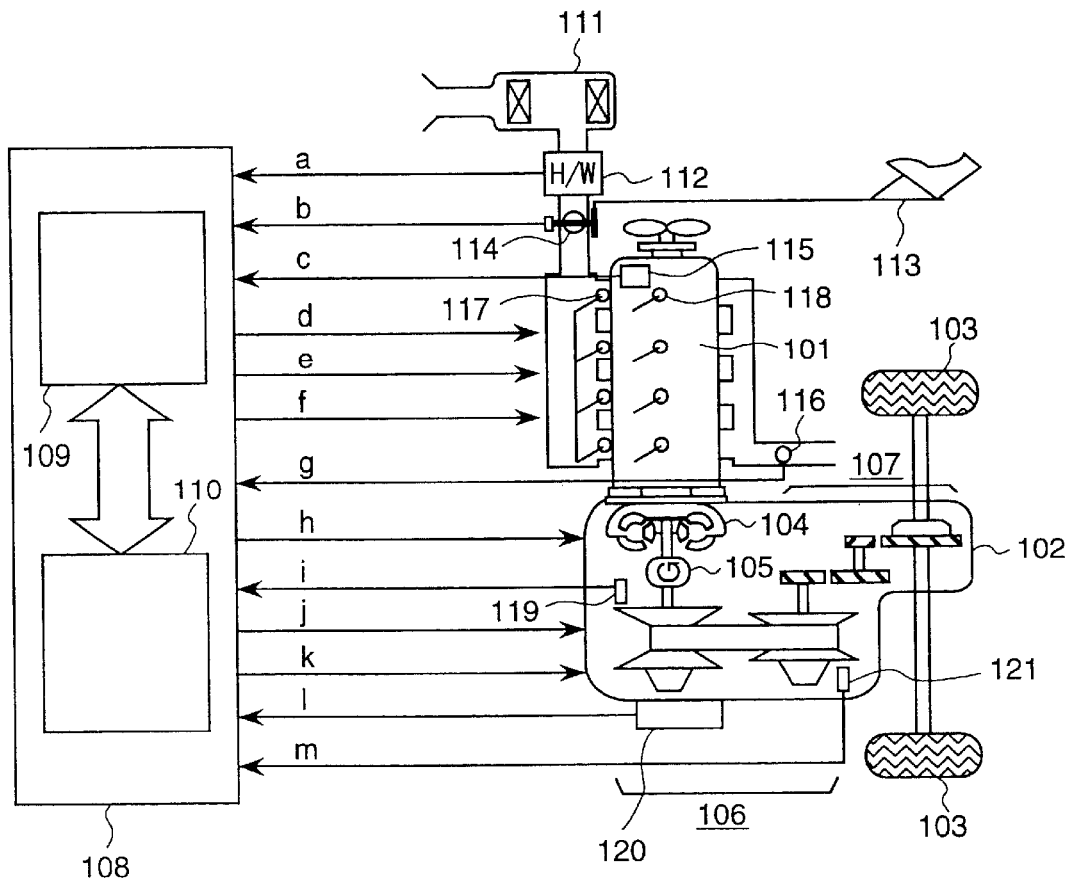
FIG. 1 is a view showing the whole configuration of a control system of the vehicle installing a continuously variable transmission (CVT) to which the present invention is applied.

FIG. 1 is a view showing the driving system of the vehicle installing a control system for a continuously variable transmission (CVT) to which the present invention is applied.

Wheels 103 are driven by an output given from an engine 101 through a CVT 102. In the present embodiment, the CVT 102 is a belt type one. The width of a groove of a pulley is changed by a oil pressure. While the belt type CVT is used in this embodiment, another type CVT such as a toroidal type one may be used in the same way. The CVT 102 comprises a torque converter 104, a back and forth travel gear 105, a transmission mechanism 106 having a pulley of which groove width is variable and a belt, and a row of transmitting gear 107 including a differential gear. these mechanism are controlled a control apparatus 108.

Figure 2:
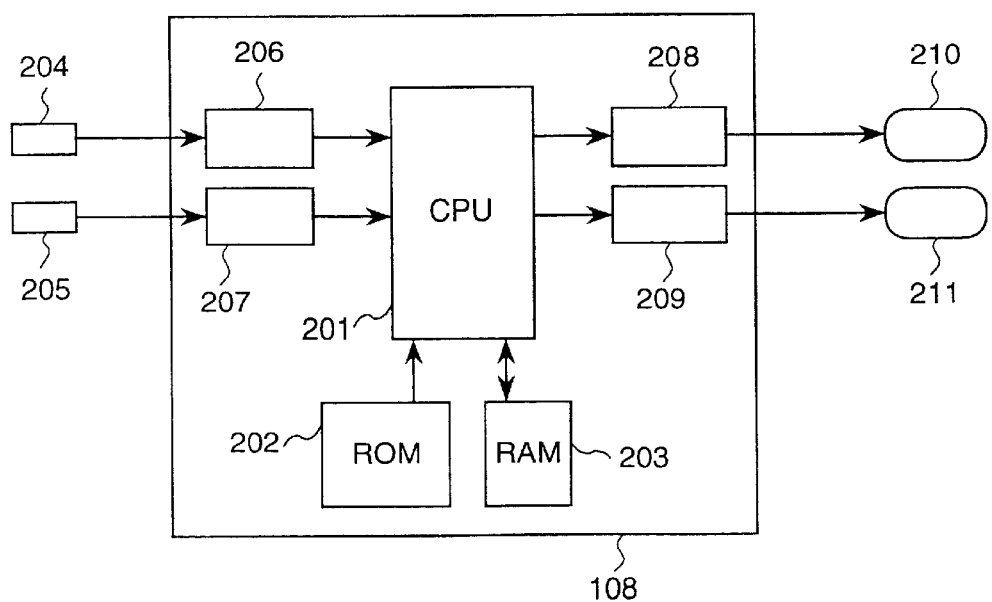
FIG. 2 is a block diagram showing the hardware configuration of a control apparatus using a microcomputer.

The control apparatus 108 has the hardware configuration shown in FIG. 2, including a microcomputer. A microprocessor 201 of the microcomputer 108 reads programs or data from a read only memory (ROM) 202, and performs an numerical operation or a logical operation by using a random access memory (RAM). Further, the microprocessor 201 inputs input signals from various kind of sensors 204, 205 through input circuits 206, 207, performs an arithmetic operation, and operates actuators 210, 211 through output circuits 208, 209.

A software for the control apparatus 108 shown in FIG. 1 comprises an engine control logic 109 for controlling the engine 101 and a CVT control logic 110 for controlling the CVT 102. The engine control logic 109 inputs an intake air amount signal a obtained by measuring the air amount passing through an air filter 111 by an air flow meter 112, a throttle opening signal b corresponding to an operated angle of a throttle valve 114 actuated by an accelerator pedal 113, a crank angle signal c or an output of a crank angle sensor 115, and a signal g indicative of the amount of oxygen remained in an exhaust gas, which is obtained from an $O_2$ sensor 116, as input signals from the engine 101. The engine control logic 109 outputs, for example, a fuel injection signal d for providing the pulse width corresponding to the fuel amount to an injector 117, an ignition signal e for controlling the operation timing of an ignition plug 118, and an EGR signal f for controlling a circulating gas valve (not shown), as output signals.

The CVT control logic 110 inputs an input engine speed signal i obtained by a rotation sensor 119 provided against a primary pulley of the CVT 102, operation oil temperature signal l of an oil pressure circuit 120, and an output engine speed signal m obtained by a rotation sensor 121 provided against a secondary pulley. Further, the CVT control logic 110 outputs a lock-up control signal h for connecting directly the input/output of the torque converter, a line pressure control signal j for controlling the whole oil pressure, and a speed-chanqe control signal k for controlling a transmission speed ratio of the transmission mechanism 106.

While the engine and the transmission are controlled by one control apparatus in the example of FIG. 1, it is needless to say that those can be controlled by different control apparatus.

Figure 3:
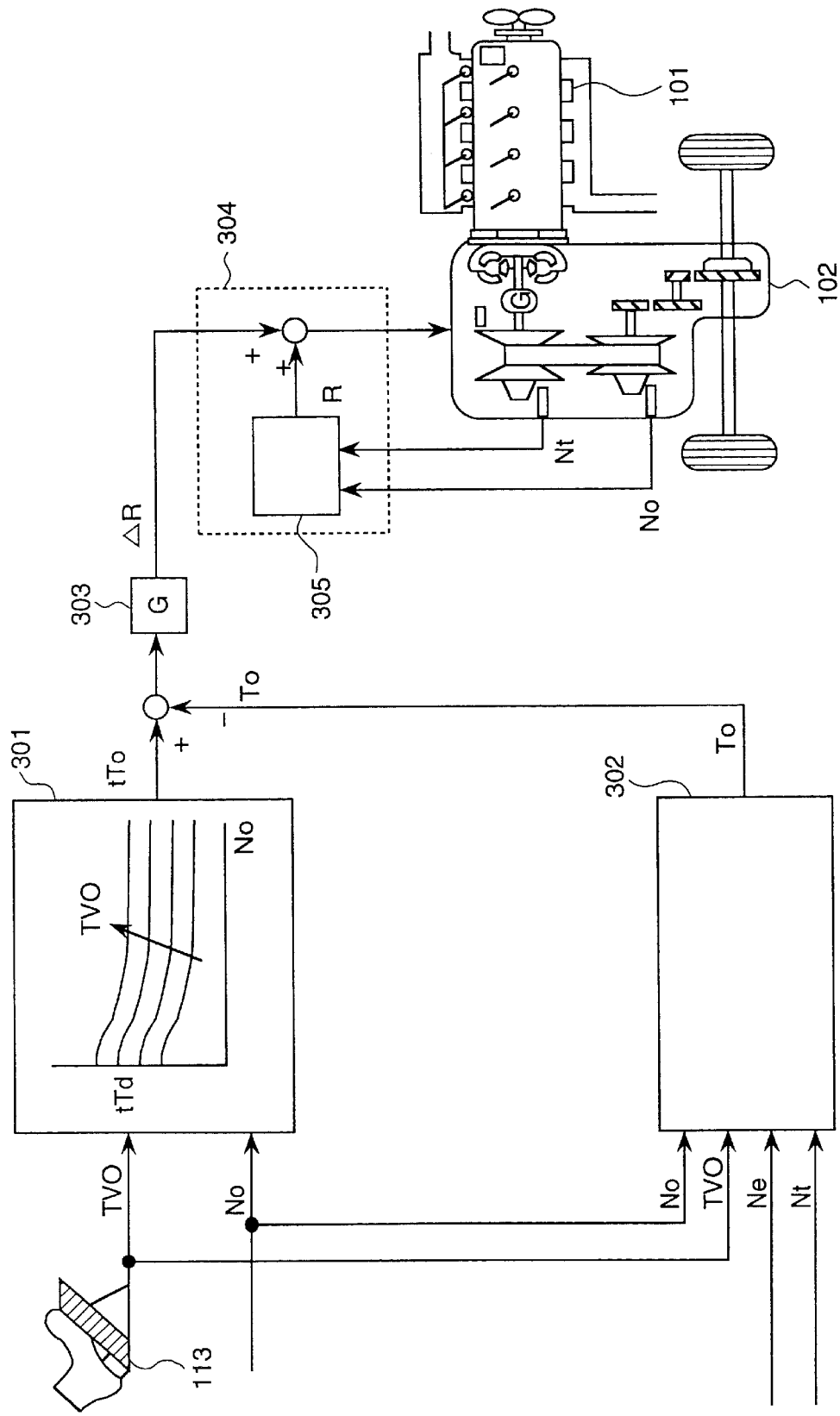
FIG. 3 is a block diagram showing the configuration of a control apparatus according to a first embodiment of the present invention.

FIG. 3 shows a first embodiment of the configuration of the gear ratio control logic used in the present invention, and represents the content of a CVT control logic 110 of FIG. 1. When the accelerator pedal 113 is stepped down, the throttle sensor 114 provided in the throttle valve is actuated and a throttle opening TVO included in the throttle opening signal b is changed. A target torque generating means 301 retrieves the torque which produces the acceleration in which the passenger comfort is provided at the vehicle speed corresponding to the output speed (rotational number) No included in an output speed signal m and the throttle opening TVO, and outputs the torque as a target output torque tTo. Namely, as the magnitude of actuation of the accelerator pedal is large, the target output torque is increased. Even if the magnitude of the actuation is the same, the target torque generating means 301 can generate the target output torque tTo by which comfortable acceleration in human technology is obtained, by setting larger target torque so as to obtain larger acceleration at low speeds and by setting smaller target torque at high speeds.

While, an output torque calculating means 302 calculates output torque To by using an engine speed Ne obtained from the crank angle signal c and a throttle opening TVO and a turbine speed Nt obtained from the input speed (rotational number) signal i, as described later. Further, a gear ratio control means 304 compares the target output torque tTo with output torque To, generates a gear-ratio-variation signal $\Delta R$ by adjusting gain of the obtained difference by a control correcting unit, adds it to the current gear ratio R calculated by a gear ratio calculating block 305, and controls the transmission gear ratio of the CVT 2. Namely, in order to bring the output torque To close to the target output torque tTo, the gear ratio is decreased if the output torque is larger, and the gear ratio is increased if smaller. The variation continues until the output torque almost becomes equal to the target. This means forms a feedback control loop.

Figure 4:
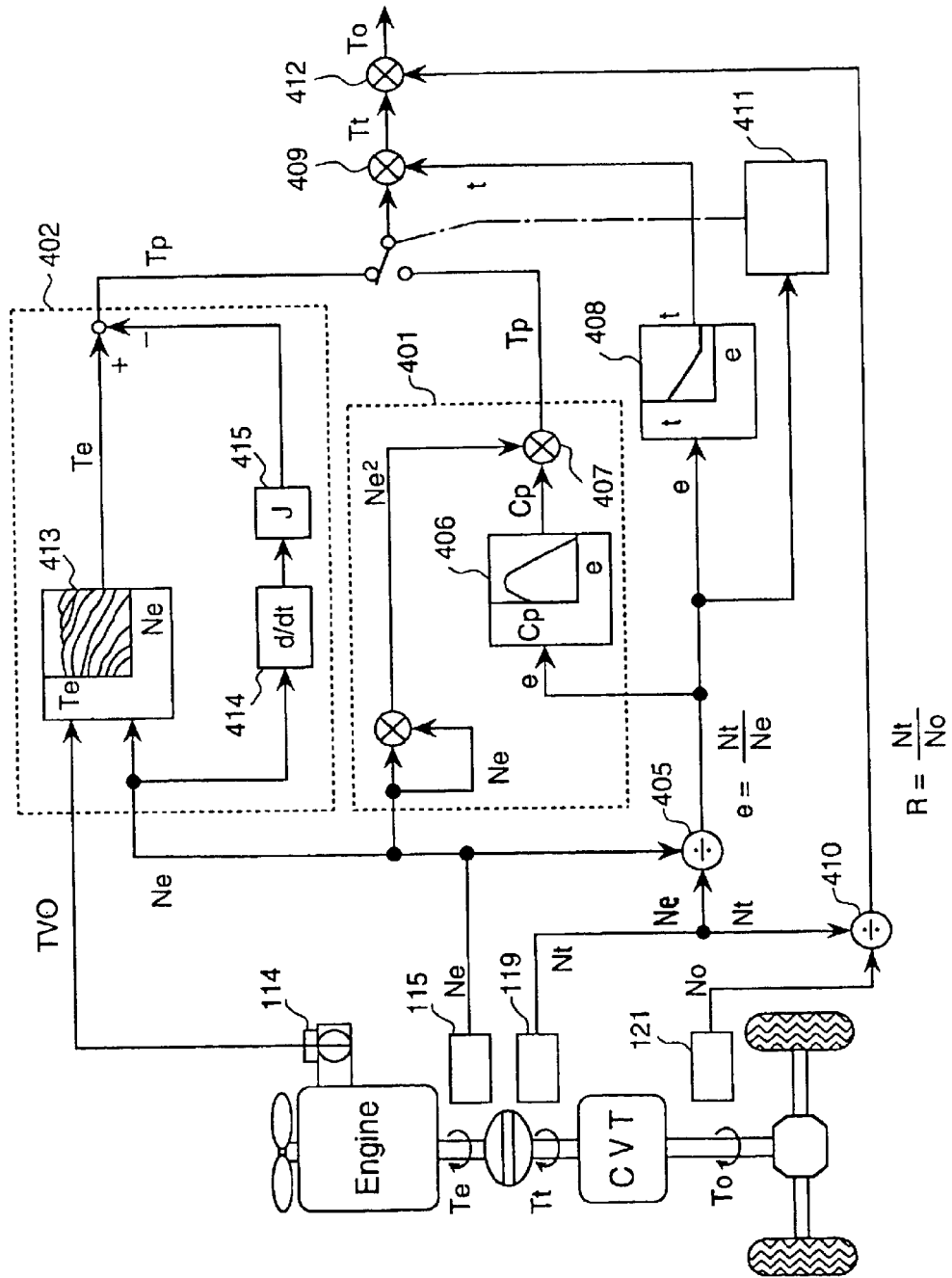
FIG. 4 is a block diagram showing the configuration of an output torque calculating means shown in FIG. 3.

FIG. 4 shows in more detail the configuration of an output torque calculating means 302 shown in FIG. 3. A block 401 calculates the speed ratio e of the torque converter at divider unit 405, by using the engine speed Ne obtained from the crank angle sensor 115 and the turbine speed Nt obtained from the rotation sensor 119. By inserting the speed ratio e into an input capacitance coefficient characteristic 406 of the torque converter, an input capacitance coefficient Cp is obtained. Further, by multiplying Cp by the square of the engine speed Ne at a multiplier unit 407, the input torque of the converter or the pump torque Tp is obtained.

In FIG. 4, the pump torque is calculated also by using another way. The two pump torque are switched according to the state. Therefore, the calculation of torque is carried out with high accuracy. Namely, a block 402 including an engine torque map 413 retrieves the engine torque Te based on the throttle opening TVO and the engine speed Ne, adds the correction of the components of inertia of blocks 414, 415, and calculates the pump torque Tp. Either an output of the block 401 or that of the block 402 is selected based on the speed ratio e by a change-over determining logic 411.

While, because the torque ratio t is obtained by providing the speed ratio e to the torque ratio characteristics 408 of the torque converter, the output torque of the torque converter or the turbine torque Tt is obtained by multiplying the torque ratio t by the selected pump torque Tp by the multiplier unit 409. Further, because the gear ratio R of a pulley can be calculated by obtaining the ratio of the output speed No obtained from the rotation sensor 121 and turbine speed Nt by the divider unit 411, the output torque To is calculated by multiplying the gear ratio R by the turbine torque Tt by multiplier unit 412.

Because the output torque follows the target driving torque set suitably by the operation of the feedback control loop according to the present invention, it is possible to obtain the comfortable feeling of acceleration corresponding to the actuation angle of an accelerator pedal. Further, because the comfortable feeling of acceleration is determined in the human technology, regardless of the kind of vehicles, it is not necessary to perform the task of the matching of the characteristics of driving forces every kind of vehicles, i.e. the tuning task, and thus it becomes possible to decrease remarkably the number of steps of development.

Because the output torque is obtained by the output torque calculating means 302 in the present invention, it is not required to provide with a high expensive torque sensor. It is not to say that the same control is realized by providing the torque sensor on an output shaft.

It should be noted that the CVT 102 is not limited to a general transmission mechanism utilizing an oil pressure. It may use another transmission mechanism in which the gear ratio is changed by changing the width of grooves of a pulley by a electric motor. Further, it may use not only a belt type transmission mechanism, but also a toroidal type one in which a friction wheel is used.

Figure 5:
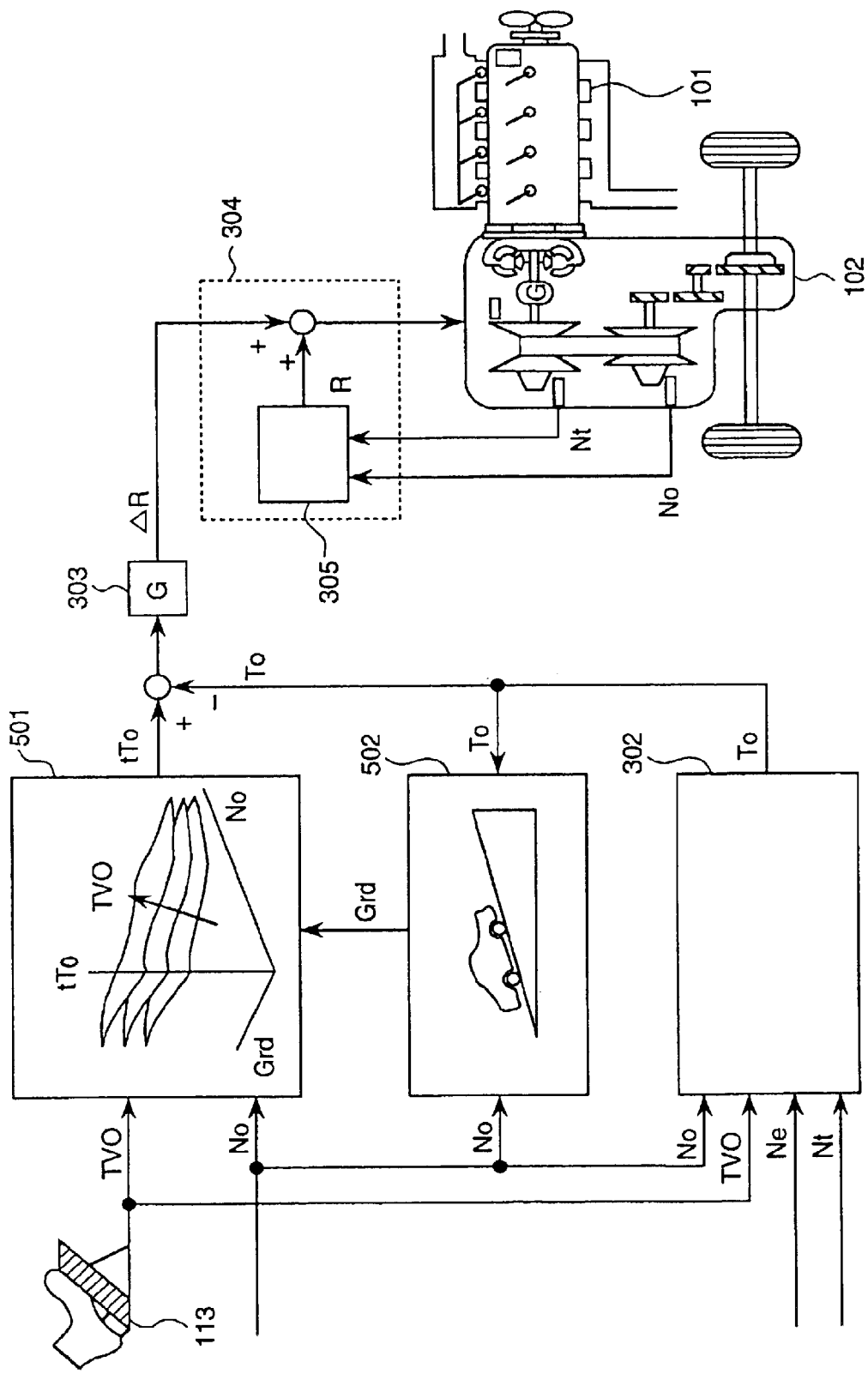
FIG. 5 is a block diagram showing the configuration of a control apparatus according to a second embodiment of the present invention.

FIG. 5 shows the configuration of a gear ratio control logic according to a second embodiment of the present invention. The same reference number as FIG. 3 designates like components. The differences between FIGS. 3 and 5 are in that a road gradient estimating and calculating means 502 is provided and thus the configuration of the target output torque generating means 501 is somewhat different.

The target output torque generating means 501 retrieves torque which produces the acceleration by which a driver feels comfortable at a current vehicle speed, and outputs it as a target output torque tTo. However, because the acceleration by which the driver can feel comfortable is different between in a slope and in a flat road, a three-dimensional look-up map is used and the target output torque pattern is changed based on a gradient signal.

Figure 6:
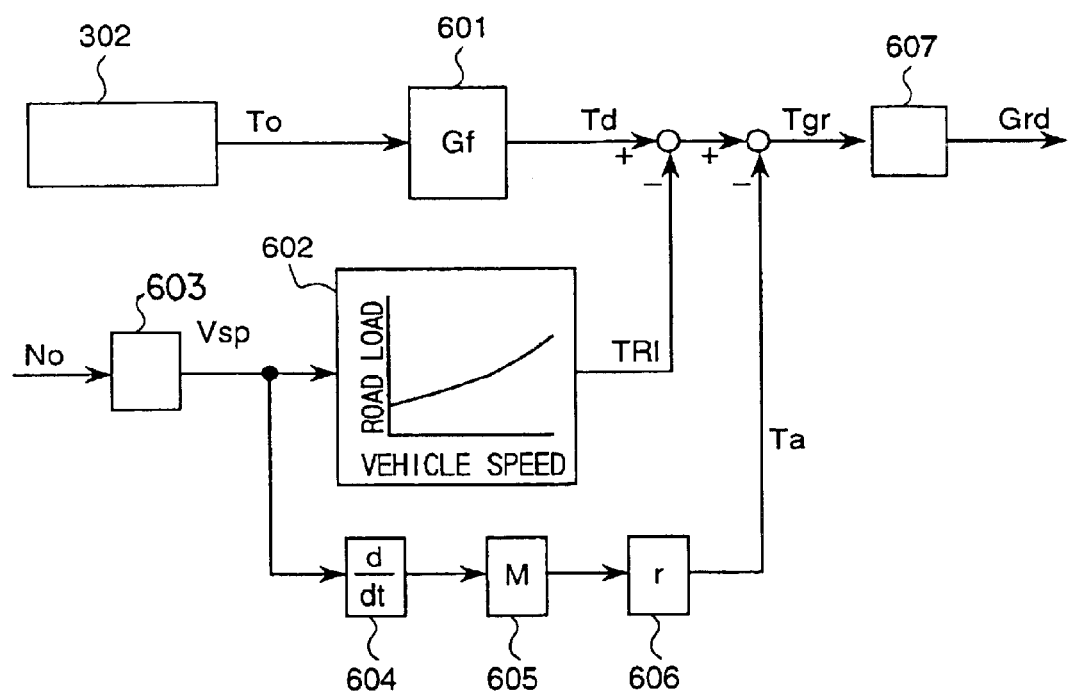
FIG. 6 is a block diagram showing the configuration of a road gradient estimating and calculating means.

FIG. 6 shows an algorithm for obtaining the gradient signal in the road gradient estimating and calculating means 502.of FIG. 5. The output torque To calculated in the output torque calculating means 302 is input to a final stage gear unit 601 in which the output torque To is multiplied by a final stage gear ratio Gf and the torque Td of a driving shaft is obtained. While, because a vehicle running resistance TR1 is changed due to the vehicle speed, the vehicle running resistance suitable for the vehicle is pre-stored in a map 602 for the vehicle running resistance. The vehicle running resistance TR1 is retrieved by using a vehicle speed vsp obtained by multiplying the output speed No by a conversion coefficient at a unit 603. At a unit 604, the acceleration is obtained by the differentiation of the vehicle speed Vsp. The acceleration is multiplied by vehicle weight M at a unit 605, and then multiplied by a radius r of a tire at a unit 606. As a result, acceleration resistance torque Ta is provided as an output of the unit 606. By subtracting these resistance torque TR1 and Ta from the obtained output torque To, the gradient resistance torque Tgr is obtained. A gradient Grd can be obtained by multiplying the torque Tgr by the conversion coefficient.

Because in the method of the present invention the driving torque corresponding to the variation of the feeling of acceleration is obtained even if the gradient of a road is changed, the comfortable feeling of acceleration is always obtained even in a slope. Further, because the road gradient is calculated during run of the vehicle, the above function is realized without using a high expensive slope sensor or acceleration sensor.

Figure 7:
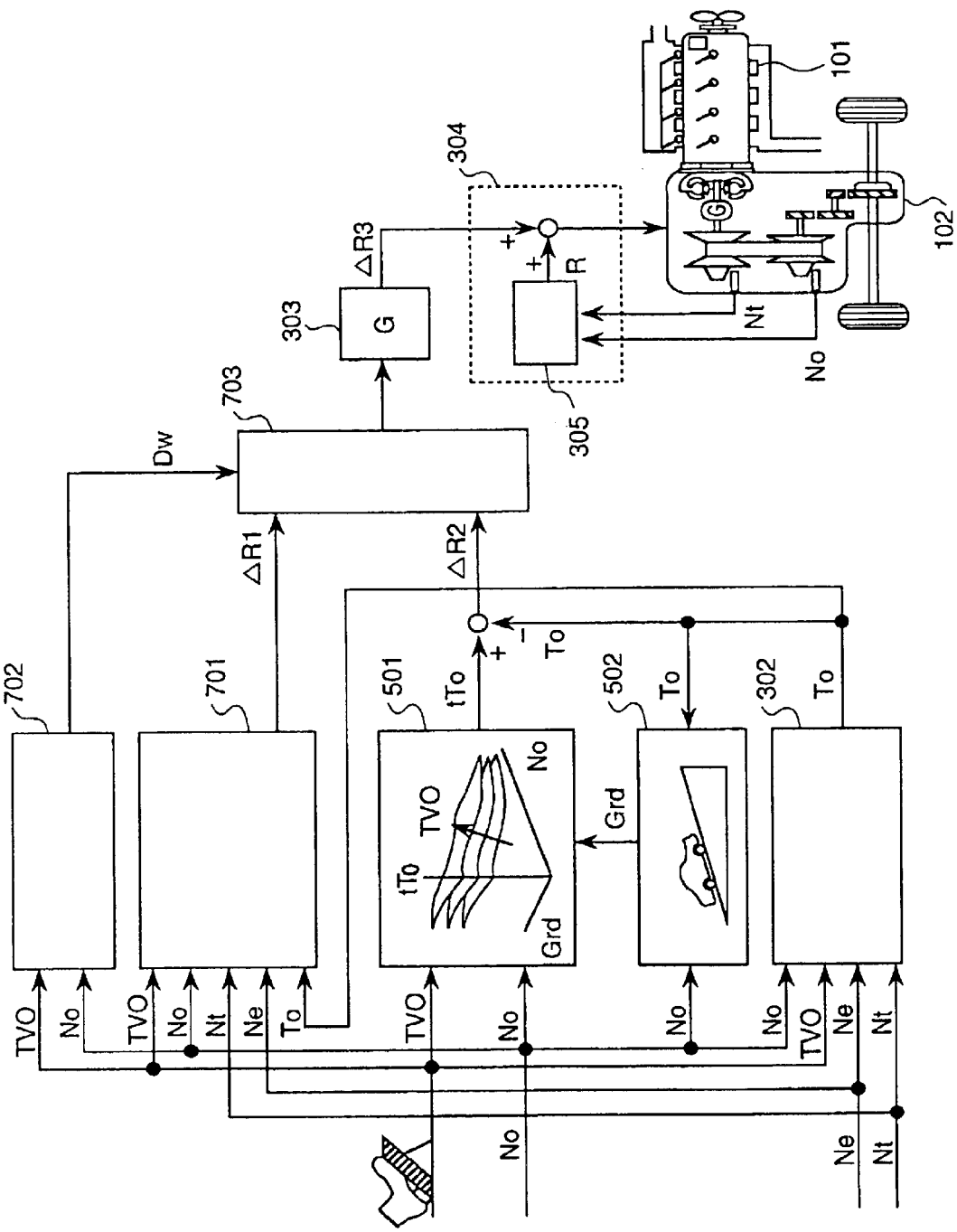
FIG. 7 is a block diagram showing the configuration of a control apparatus according to a third embodiment of the present invention.

FIG. 7 shows the configuration of a gear ratio control logic according to a third embodiment of the present invention. There is provided means 701 for calculating the gear ratio which provides the optimum fuel consumption rate, means 702 for recognizing driver's intention and environment and weighting and combining means 703 in the configuration shown in FIG. 7, different from the configuration of FIG. 5.

The means 701 for calculating the gear ratio which provides the optimum fuel consumption rate includes a characteristic map indicative of the amount of fuel consumption of an engine. The means 701 calculates the current amount of fuel consumption by using a throttle opening TVO, an output speed No, an engine speed Ne, a turbine speed Nt, and output torque To calculated by the output torque calculating means 302, calculates the amount of fuel consumption under the assumption that the gear ratio is changed by a little, determines the direction of the gear ratio in which the fuel consumption rate is improved, and generates a first gear-ratio-variation signal Δ R1.

Further, the output torque To is compared with the target output torque tTo as in the case of the embodiment of FIG. 2, and the obtained difference is set as a second gear-ratio-variation signal Δ R2.

These signals Δ R1 and Δ R2 are input to the weighting and combining means 703. In the means 703, the rate of the weighting is determined according to an output Dw of the means 702 for recognizing driver's intention and environment and then combined.

An output of the weighting and combining means 703 is adjusted in its gain by the control correcting unit 303, and a third gear-ratio-variation signal Δ R3 is generated. The signal Δ R3 is added to the current gear ratio R calculated by the gear ratio calculating block 305. The gear ratio of the CVT 2 is controlled by the added signal.

If the driver's intention Dw aims at the improvement of acceleration performance, the output of the weighting and combining means 703 approaches to the second gear-ratio-variation signal Δ R2. As a result, the gear ratio is controlled so as to produce the torque by which the comfortable acceleration is obtained. On the contrary, if the driver does not almost move the accelerator pedal, the means 702 for recognizing the driver's intention and environment recognizes no requirement of acceleration. As a result, the output of the weighting and combining means 703 approaches to the first gear-ratio-variation signal Δ R1 and the gear ratio is changed so that amount of fuel consumption may be lessened. Generally, the weighting is performed between R1 and R2, and thus the gear ratio is controlled according to the output Dw of the means 702 for recognizing the driver's intention and environment with keeping the balance of the feeling of acceleration and the fuel consumption rate.

Figure 8:
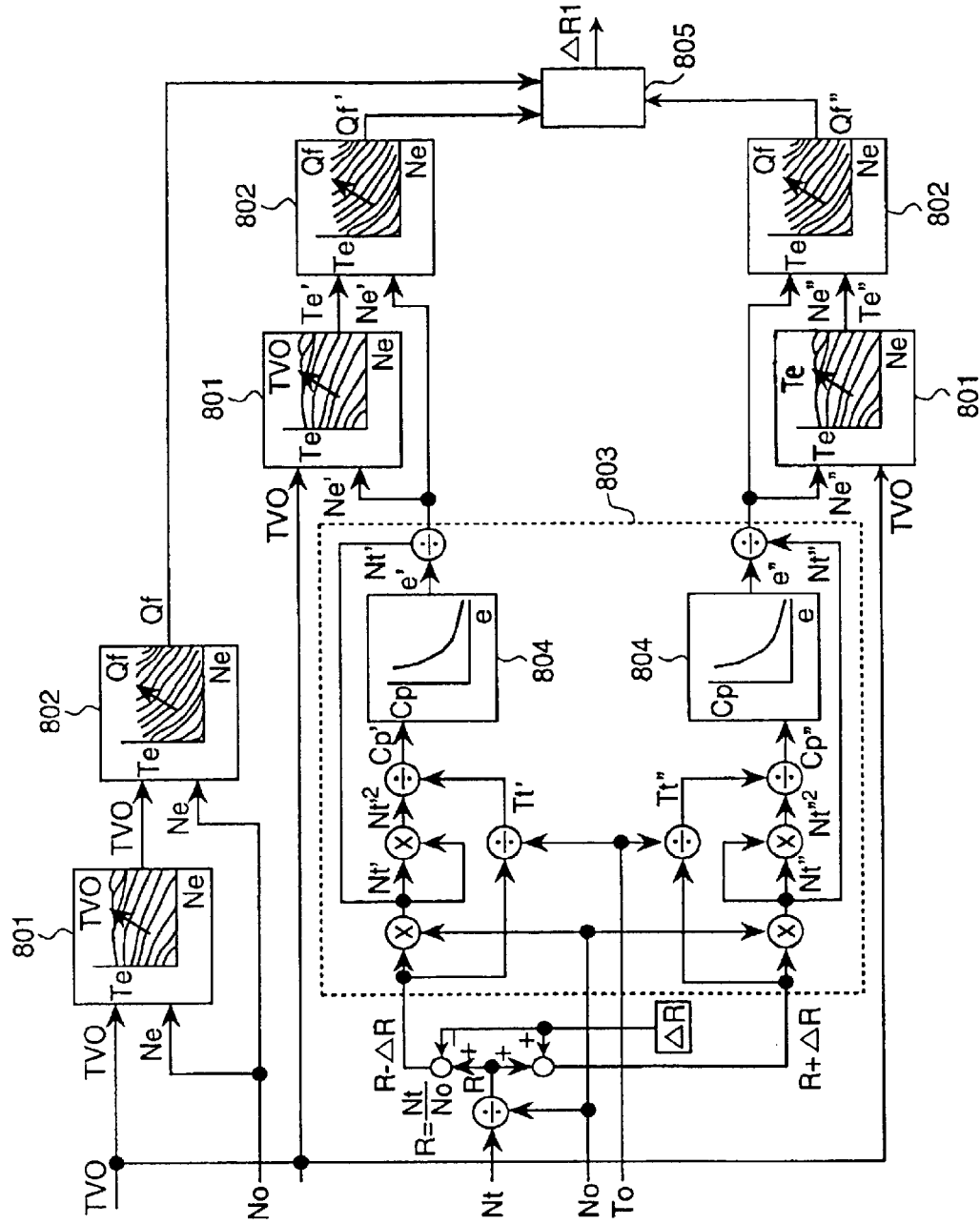
FIG. 8 is a block diagram showing the configuration of a means for calculating the gear ratio which provides the optimum fuel consumption rate shown in FIG. 7.

FIG. 8 shows the configuration of means 701 for calculating the gear ratio which provides the optimum fuel consumption rate shown in FIG. 7.

In FIG. 8, the engine torque Te can be retrieved by providing the throttle opening TVO and the engine speed Ne to an engine torque characteristic map 801. Further, by providing the obtained engine torque Te and the engine speed Ne to a fuel consumption amount characteristic map 802, the amount Qf of fuel consumption is obtained. The current gear ratio R can be obtained from the output speed No and the turbine speed Nt. The results obtained by adding and subtracting the predetermined variation component Δ R of the gear ratio, respectively, to and from the gear ratio R, are input to a torque converter speed correcting unit 803. The result (R−Δ R) obtained by subtracting the variation component of the gear ratio is multiplied by the output speed No. As a result, the temporal turbine speed Nt' is obtained and then the square of Nt' is calculated.

While, the temporal turbine torque Tt' is calculated from the output torque To and (R−Δ R), and then the temporal capacitance coefficient Cp' is obtained from Tt' and the square of the turbine speed. Further, the temporal speed ratio e' is calculated by retrieving the capacitance coefficient characteristic map 804, and the temporal engine speed Ne' is obtained by dividing the temporal turbine speed Nt' by the temporal speed ratio e'. Therefore, the temporal fuel consumption amount Qf' can be obtained in the same way as mentioned above.

Also if the temporal turbine torque Tt' is calculated from the output torque To and (R+Δ R), the temporal fuel consumption amount Qf" can be obtained just in the same way as mentioned above.

Both Qf' and Qf" are compared with the current fuel consumption amount Qf by the minimum fuel consumption rate determining unit 805. Next, the direction of the variation of the gear ratio in which the fuel consumption rate is improved is determined, and the first gear-ratio-variation signal Δ R1 is output.

Figure 9:
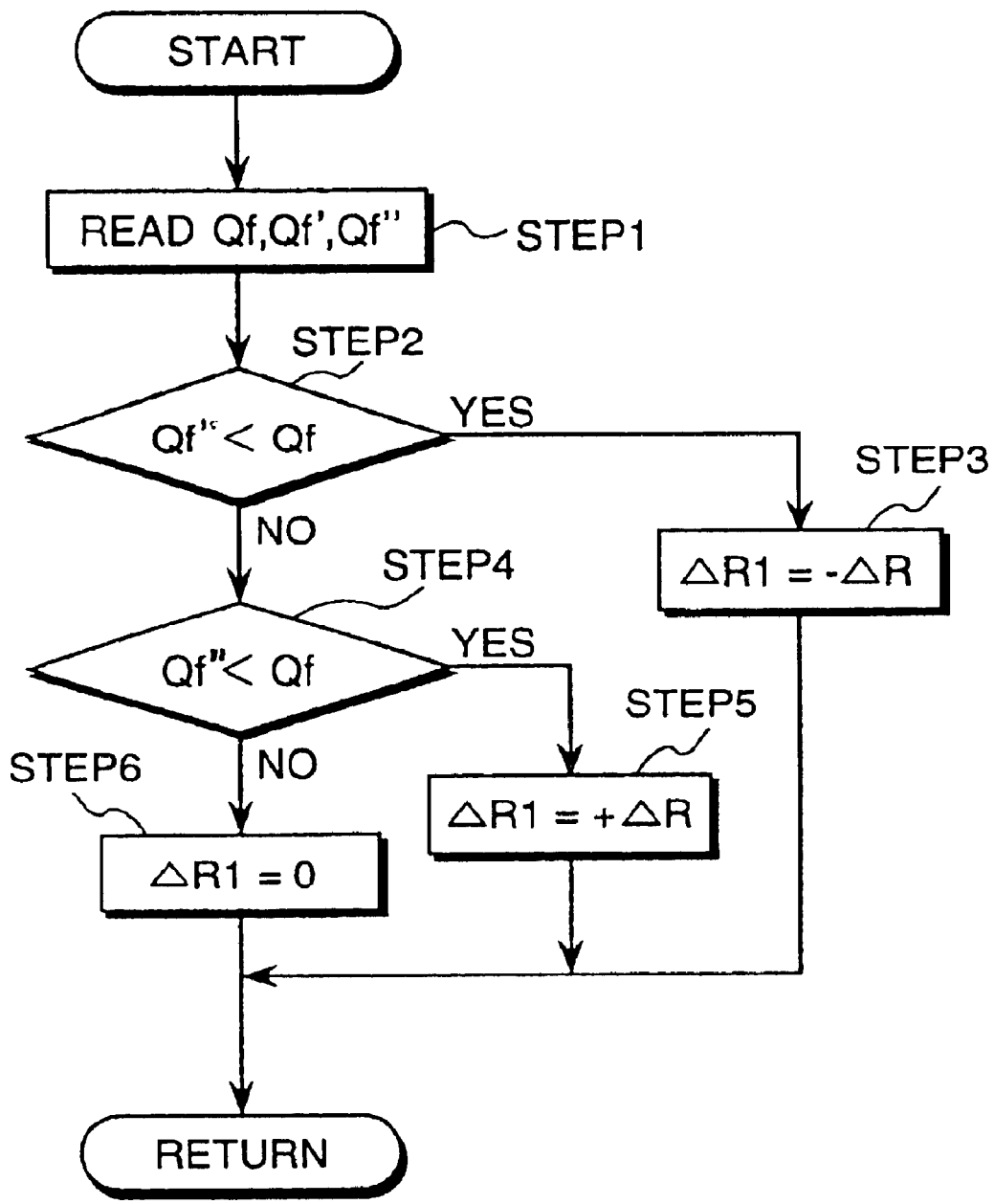
FIG. 9 is a flow chart illustrating the operation of a minimum fuel-consumption-rate determining unit in the means for calculating the gear ratio which provides the optimum fuel consumption rate shown in FIG. 8.

FIG. 9 is a flow chart illustrating the logic of a minimum fuel-consumption-rate determining unit 805 of FIG. 8.

In FIG. 9, three fuel consumption amounts Qf, Qf', Qf" are read at step 1, and Qf is compared with Qf' at step 2. If Qf' is smaller than Qf, then because the fuel consumption rate is improved as the gear ratio becomes smaller, the processing advances to step 3, in which the gear-ratio-variation component is set to (Δ R1=−Δ R).

If Qf' is larger than Qf, then Qf is compared with Qf" at step 4. If Qf" is smaller than Qf, then because the fuel consumption rate is improved as the gear ratio becomes smaller, the processing advances to step 5, in which the gear-ratio-variation component is set to (Δ R1=+Δ R).

If Qf" is larger than Qf, then because both Qf' and Qf" are larger than Qf, the processing advances to step 6, in which the gear ratio is set to (Δ R1=0) or kept as it is.

The detail of the means 702 for recognizing the driver's intention and environment is abbreviated here.

Figure 10:
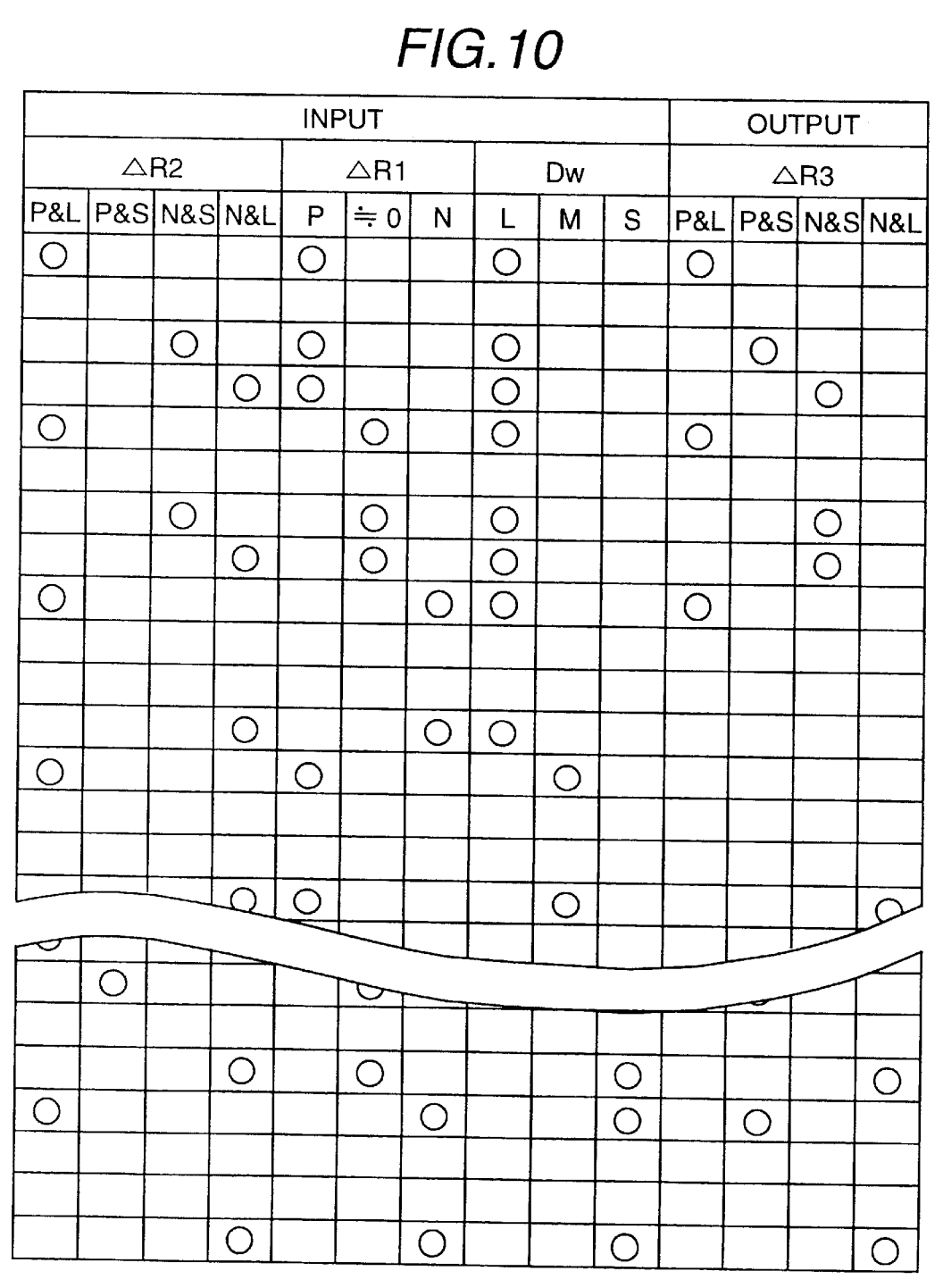

It is convenient to use the fuzzy inference in the weighting and combining means 703. An example of the rule of the fuzzy inference is shown in FIG. 10. The rule of FIG. 10 is determined so that the third gear-ratio-variation signal A R3 may be output according to the combination of respective states, by setting the first gear-ratio-variation signal A R1 for obtaining the optimum fuel consumption rate, the second gear-ratio-variation signal Δ R2 corresponding to the torque difference and the driver's intention Dw for acceleration as input variables. A membership function is set by using this rule, and the weighting and combining processing is performed. In partially spaced parts in FIG. 10, the rule is abbreviated. Those parts are filled due to the function of interpolation of the fuzzy inference.

It is further understood by those skilled in the art that the foregoing description is a preferred embodiment of the disclosed apparatus and that various changes and modifications may be made in the invention without departing from the spirit and scope thereof.

What is claimed is:

1. A control apparatus for an automatic transmission of a vehicle including a gear ratio calculating unit for controlling the automatic transmission to transfer an output of an engine of the vehicle to driven wheels, for changing a gear ratio, and for calculating the gear ratio, and a speed- change control unit for controlling the gear ratio based on a result of the calculation, comprising:

a target driving torque generating unit for generating a value of a target driving torque based on an adaptation coefficient indicative of a vehicle running state and a vehicle speed, a driving torque calculating unit for calculating a value of driving torque based on the adaptation coefficient, vehicle speed and engine speed, a correcting unit for obtaining a correcting value for correcting the value of the target driving torque by deriving a difference between the driving torque calculated by said driving torque calculating unit and the target driving torque, and a gear-ratio-change-command unit for generating a gear-ratio-change-command based on the correcting value obtained by said correcting unit, and for commanding a change in the gear ratio, wherein said speed-change control unit changes the gear ratio based on the gear-ratio-change-command from the gear-ratio-change-command unit.

2. A control apparatus for an automatic transmission of a vehicle according to claim 1, wherein the value of the target driving torque is determined from predetermined target driving torque characteristics based on the adaptation coefficient and the vehicle speed.

3. A control apparatus for an automatic transmission of a vehicle according to claim 1, wherein the adaptation coefficient is an opening of a throttle valve for controlling an amount of air taken into the engine of the vehicle.

4. A control apparatus for an automatic transmission of a vehicle including a gear ratio calculating unit for controlling the automatic transmission to transfer an output of an engine of the vehicle to driven wheels, for changing a gear ratio, and for calculating the gear ratio, and a speed-change control unit for controlling the gear ratio based on a result of the calculation, comprising:

a road gradient calculating unit for calculating a gradient of a road, a target driving torque generating portion for generating a value of a target driving torque based on an adaptation coefficient indicative of a vehicle running state, a vehicle speed and the road gradient, a driving torque calculating unit for calculating a value of driving torque based on the adaptation coefficient, vehicle speed and engine speed, a correcting unit for obtaining a correcting value for correcting the value of the target driving torque by deriving a difference between the driving torque calculated by said driving torque calculating unit and the target driving torque, and a gear-ratio-change-command means for generating a gear-ratio-change-command based on the correcting value obtained by said correcting unit and for commanding a change in the gear ratio, wherein said speed-change control unit changes the gear ratio based on the gear-ratio-change-command from the gear-ratio-change-command means.

5. A control apparatus for an automatic transmission of a vehicle according to claim 4, wherein the value of the target driving torque is determined from predetermined target driving torque characteristics based on the adaptation coefficient, the vehicle speed and the road gradient.

6. A control apparatus for an automatic transmission of a vehicle according to claim 4, wherein the road gradient is calculated based on vehicle speed and the value of the driving torque calculated by the driving torque calculating unit.

7. A control apparatus for an automatic transmission of a vehicle including a gear ratio calculating unit for controlling the automatic transmission to transfer an output of an engine of the vehicle to driven wheels, for changing a gear ratio, and for calculating the gear ratio, and a speed-change control unit for controlling the gear ratio based on a result of the calculation, comprising:

a fuel consumption calculating unit for calculating an amount of fuel consumption, a first gear-ratio-change-command unit for generating a first gear-ratio-change-command, based on the fuel consumption amount calculated by the fuel consumption calculating unit, a road gradient calculating unit for calculating a gradient of a road, a target driving torque generating portion for generating a value of target driving torque based on an adaptation coefficient indicative of a vehicle running state, a vehicle speed and the road gradient, a driving torque calculating unit for calculating a value of driving torque based on the adaptation coefficient, vehicle speed, engine speed and a turbine speed, a second gear-ratio-change-command unit for correcting the target driving torque by deriving a difference between the driving torque calculated by said driving torque calculating unit and the target driving torque, and generating a second gear-ratio-change-command, a means for recognizing driver's intention and running environment based on the adaptation coefficient and the vehicle speed, and a fuzzy inference means for generating a third gear-ratio-change-command based on an output value of the first gear-ratio-change-command unit, an output value of the second gear-ratio-change-command unit, an output value of the means for recognizing driver's intention and running environment and a predetermined rule for fuzzy inference, wherein said speed-change control unit changes the gear ratio based on the third gear-ratio-change-command generated by the fuzzy inference means.

8. A control apparatus for an automatic transmission of a vehicle according to claim 7, wherein the fuzzy inference is performed by weighting the first gear-ratio-change-command as compared with the second gear-ratio-change-command.

9. A method of controlling an automatic transmission for a vehicle, in which a gear ratio of the automatic transmission is changed based on conditions for speed-change, in which a load of an engine for the vehicle is set as a parameter, comprising the steps of:

changing conditions for speed-change based on an operation mode selected from at least two modes including a mode which aims at improvement of acceleration and a mode which aims at improvement of a fuel consumption rate, and correcting a value of a target driving torque by using a driving torque obtained based on a value indicative of a running state of the vehicle, a vehicle speed, an engine speed and a turbine speed of a torque converter for the automatic transmission, wherein, in area of a low load, a magnitude of variation of the engine speed relative to variation of engine load is set larger in the mode which aims at improvement of acceleration than in the mode which aims at improvement of the fuel consumption rate, and wherein, in an area of a high load, the magnitude of variation of the engine speed relative to variation of engine load is set larger in the mode which aims at improvement of the fuel consumption rate than in the mode which aims at improvement of acceleration.

10. A method of controlling an automatic transmission for a vehicle according to claim 9, further comprising the steps of:

inferring an adaptation coefficient based on a predetermined rule for fuzzy inference, and changing conditions of speed-change by using the fuzzy inference for determining the adaptation coefficient based on the extent of the increase and decrease of the inferred adaptation coefficient.

11. A method of controlling an automatic transmission for a vehicle according to claim 9, wherein conditions of speed-change are changed by using the fuzzy inference for inferring the extent of the increase and decrease of a an adaptation coefficient and determining the adaptation coefficient based on the extent of an increase and decrease.

12. A control apparatus for an automatic transmission of a vehicle which has an accelerator physically linked with a throttle valve for adjusting an output of an internal combustion engine, a transmission speed ratio calculating unit for controlling the automatic transmission to transfer an output of the engine to driven wheels, and for changing a transmission speed ratio, and for calculating the transmission speed ratio, and a speed-change control unit for controlling the transmission speed ratio based on a result of a calculation, comprising:

a target driving torque generating unit for generating a value of a target driving torque based on an adaptation coefficient indicative of a vehicle running state and a vehicle speed, a driving torque calculating unit for calculating a value of driving torque based on the adaptation coefficient, vehicle speed and engine speed, a correcting unit for obtaining a correcting value for correcting the value of the target driving torque based on the value of the driving torque calculated by said driving torque calculating unit and correcting the target driving torque, and a transmission speed-ratio-change-command unit for generating a transmission speed-ratio-change-command based on the correcting value obtained by said correcting unit and for commanding a change in the transmission speed ratio, wherein said speed-change control unit changes the transmission speed ratio based on the transmission speed-ratio-change-command from the transmission speed-ratio-change-command unit.

13. A control apparatus for an automatic transmission of a vehicle according to claim 12, wherein the value of the target driving torque is determined from predetermined target driving torque characteristics based on the adaptation coefficient and the vehicle speed.

14. A control apparatus for an automatic transmission of a vehicle according to claim 12, wherein the adaptation coefficient is an opening of a throttle valve for controlling an amount of air taken into the engine of the vehicle.

15. A control apparatus for an automatic transmission of a vehicle which has an accelerator physically linked with a throttle valve for adjusting an output of an internal combustion engine, a transmission speed ratio calculating unit for controlling the automatic transmission to transfer an output of the engine to driven wheels, and for changing a transmission speed ratio, and for calculating the transmission speed ratio, and a speed-change control unit for controlling the transmission speed ratio based on a result of the calculation, comprising:

a road gradient calculating unit for calculating a gradient of a road, a target driving torque generating portion for generating a value of target driving torque based on an adaptation coefficient indicative of a vehicle running state, a vehicle speed and the road gradient, a driving torque calculating unit for calculating a value of driving torque based on the adaptation coefficient, vehicle speed and engine speed, a correcting unit for obtaining a correcting value for correcting the value of the target driving torque based on the value of the driving torque calculated by said driving torque calculating unit and correcting the target driving torque, and a transmission speed-ratio-change-command unit for generating a transmission speed-ratio-change-command based on the correcting value obtained by said correcting unit and for commanding a change in the transmission speed ratio, wherein said speed-change control unit changes the transmission speed ratio based on the transmission speed-ratio-change-command from the transmission speed-ratio-change-command unit.

16. A control apparatus for an automatic transmission of a vehicle according to claim 15, wherein the value of the target driving torque is determined from predetermined target driving torque characteristics based on the adaptation coefficient, the vehicle speed and the road gradient.

17. A control apparatus for an automatic transmission of a vehicle according to claim 15, wherein the road gradient is calculated based on vehicle speed and the value of the driving torque calculated by the driving torque calculating unit.

18. A control apparatus for an automatic transmission of a vehicle including a gear ratio calculating unit for controlling the automatic transmission to transfer an output of an engine of the vehicle to driven wheels after changing the gear ratio, and calculating the gear ratio, and a speed-change control unit for controlling the gear ratio based on the result of the calculation, comprising:

a target driving torque generating unit for generating a value of the target driving torque based on an adaptation coefficient indicative of a vehicle running state and a vehicle speed, a driving torque calculating unit for calculating a value of driving torque based on the adaptation coefficient, the vehicle speed and the engine speed, a correcting unit forming a feedback system for driving torque taking gear ratio as a control amount, and a gear-ratio-change-command unit for generating a gear-ratio-change-command based on the correcting value obtained by said correcting unit and commanding the change in the gear ratio, wherein said speed-change control unit changes the gear ratio based on the gear-ratio-change-command from the gear-ratio-change-command unit.

19. A control apparatus for an automatic transmission of a vehicle including a gear ratio calculating unit for controlling the automatic transmission to transfer an output of an engine of the vehicle to driven wheels, for changing gear ratio, and for calculating the gear ratio, and a speed-change control unit for controlling the gear ratio based on a result of the calculation, comprising:

a road gradient calculating unit for calculating gradient of a road, a target driving torque generating portion for generating a value of a target driving torque based on an adaptation coefficient indicative of a vehicle running state, a vehicle speed and the road gradient, a driving torque calculating unit for calculating a value of driving torque based on the adaptation coefficient, vehicle speed and engine speed, a correcting unit forming a feedback system for driving torque taking gear ratio as a control amount, and a gear-ratio-change-command means for generating a gear-ratio-change-command based on the correcting value obtained by said correcting unit and for commanding change in the gear ratio, wherein said speed-change control unit changes the gear ratio based on the gear-ratio-change-command from the gear-ratio-change-command means.

20. A method of controlling an automatic transmission for a vehicle, in which a gear ratio of the automatic transmission is changed based on conditions for speed-change, in which a load of an engine for the vehicle is set as a parameter, comprising the steps of:

changing conditions for speed-change based on an operation mode selected from at least two modes including a mode which aims at improvement of acceleration and a mode which aims at the improvement of fuel consumption rate, and forming a feedback system for driving torque taking gear ratio as a control amount, wherein, the area of a low load, a magnitude of variation of the engine speed relative to variation of the engine load is set larger in the mode which aims at the improvement of acceleration maybe larger than in a mode which aims at improvement of fuel consumption rate, and wherein, in an area of a high load, the magnitude of variation of the engine speed relative to variation of engine load is set larger in the mode which aims at improvement of the fuel consumption rate than in the mode which aims at improvement of acceleration at an area of a high load.

21. A control apparatus for an automatic transmission of a vehicle which has an accelerator physically linked with a throttle valve for adjusting an output of an internal combustion engine, a transmission speed ratio calculating unit for controlling the automatic transmission to transfer an output of the engine to driven wheels, and for changing a transmission speed ratio, and for calculating the transmission speed ratio, and a speed-change control unit for controlling the transmission speed ratio based on the result of a calculation, comprising:

a target driving torque generating unit for generating a value of a target driving torque based on an adaptation coefficient indicative of a vehicle running state and a vehicle speed, a driving torque calculating unit for calculating a value of driving torque based on the adaptation coefficient, vehicle speed and engine speed, a correcting unit forming a feedback system for driving torque taking gear ratio as a control amount, and a transmission speed ratio-change command unit for generating a transmission speed ratio-change command based on the correcting value obtained by said correcting unit and for commanding the change in the transmission speed ratio, wherein said speed-change control unit changes the transmission speed ratio based on the transmission speed ratio-change command from the transmission speed-ratio-change command unit.

22. A control apparatus for an automatic transmission of a vehicle which has an accelerator physically linked with a throttle valve for adjusting an output of an internal combustion engine, a transmission speed ratio calculating unit for controlling the automatic transmission to transfer an output of the engine to driven wheels, and for changing a transmission speed ratio, and for calculating the transmission speed ratio, and a speed-change control unit for controlling the transmission speed ratio based on a result of the calculation, comprising:

a road gradient calculating unit for calculating a gradient of a road;

a target driving torque generating portion for generating a value of the target driving torque based on an adaptation coefficient indicative of a vehicle running state, a vehicle speed and the road gradient, a driving torque calculating unit for calculating a value of driving torque based on the adaptation coefficient, vehicle speed and engine speed, a correcting unit forming a feedback system for driving torque taking gear ratio as a control amount, and a transmission speed-ratio-change-command unit for generating a transmission speed-ratio-change-command based on the correcting value obtained by said correcting unit and for commanding a change in the transmission speed ratio, wherein said speed-change control unit changes the transmission speed ratio based on the transmission speed-ratio-command unit.

* * * * *